(No Model.)
S. DEDERICK.
APPARATUS FOR GATHERING, ELEVATING, AND TRANSPORTING HOGS.
No. 555,233. Patented Feb. 25, 1896.
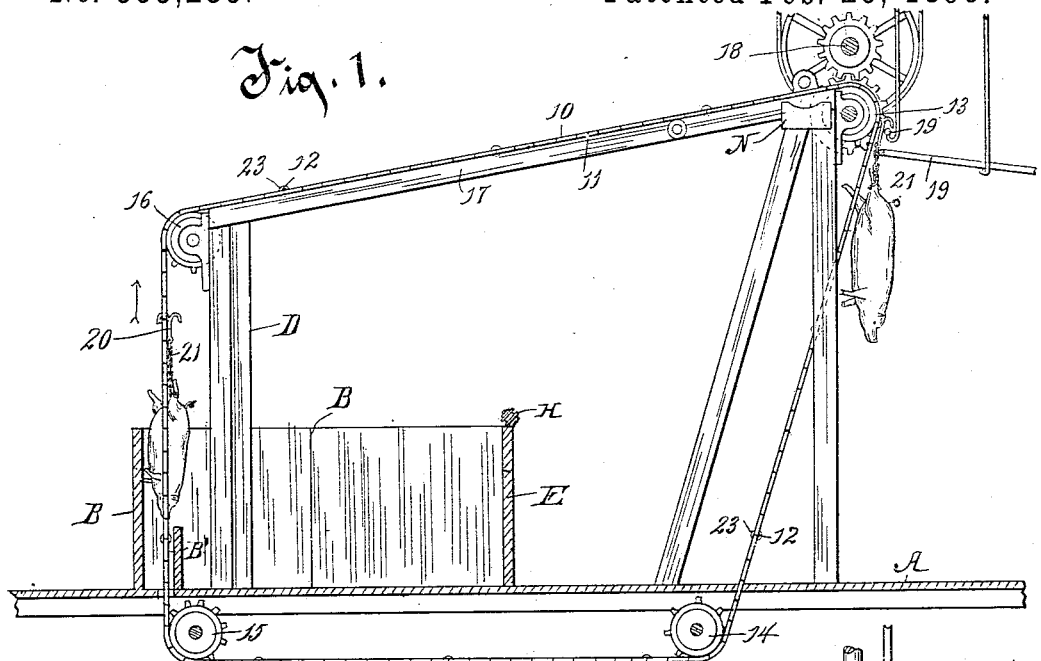
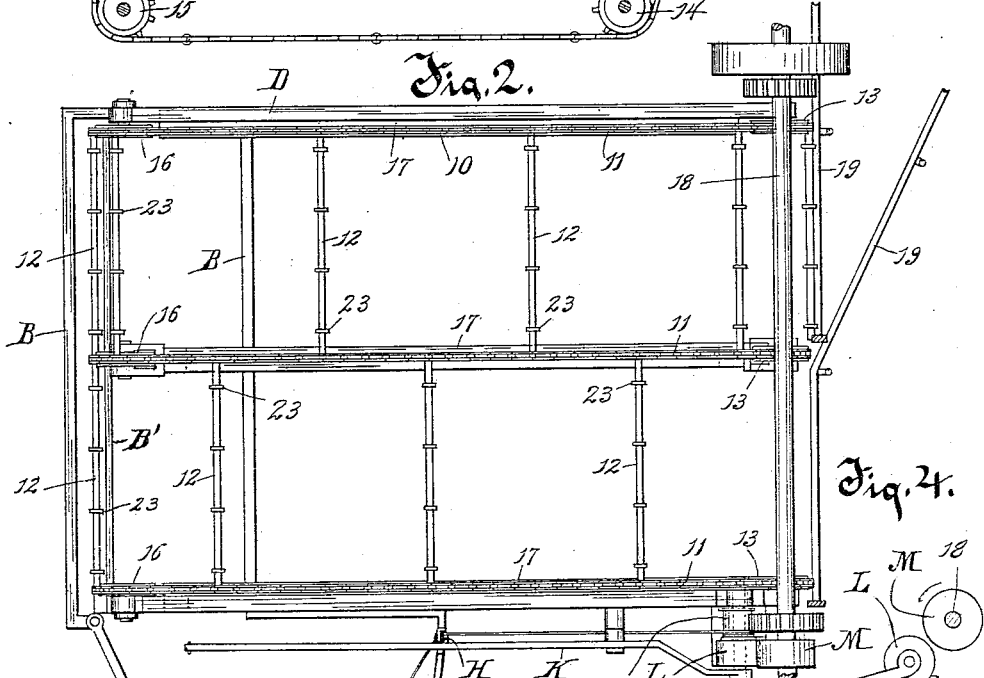
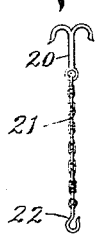

UNITED STATES PATENT OFFICE.

SOLON DEDERICK, OF MILWAUKEE, WISCONSIN.

APPARATUS FOR GATHERING, ELEVATING, AND TRANSPORTING HOGS.

SPECIFICATION forming part of Letters Patent No. 555,233, dated February 25, 1896.

Application filed August 9, 1895. Serial No. 558,721. (No model.)

*To all whom it may concern:*

Be it known that I, SOLON DEDERICK, of Milwaukee, in the county of Milwaukee and State of Wisconsin, have invented a new and useful Improvement in Apparatus for Gathering, Elevating, and Transporting Hogs in a Slaughter-House, of which the following is a description, reference being had to the accompanying drawings, which are a part of this specification.

The object of my invention is chiefly to provide apparatus or mechanism for automatically elevating and transferring hogs from a pen to a skid and slide along which they are transferred to the scalding-tub and to the locality for dressing them, which mechanism is simple in construction, strong and reliable in quality, and convenient in use, and incidentally thereto to provide apparatus adapted automatically to gather the hogs into a narrow suitable pen or portion of a pen for catching and securing them to the elevating and transporting mechanism.

My invention consists of the mechanism or apparatus and its parts and combination of parts, as hereinafter described and claimed, or their equivalents.

In the drawings, Figure 1 is a vertical longitudinal section of the elevating and transporting apparatus. Fig. 2 is a top plan view of the entire apparatus. Figs. 3 and 4 are details.

In the drawings, A is the floor of the slaughter-house, or of a platform constructed adjacent to the slaughter-house.

B B are the walls of a pen on the floor A, which pen is provided with an enlarged portion or yard C adjacent thereto.

D is a permanent frame, suitable for supporting operative parts of the mechanism.

An endless carrier 10, consisting of a plurality or series of endless chain belts 11 11 of equal length and disposed in parallel planes and having homologous courses opposite to each other and provided with and connected together by transverse rods or rungs 12 12, is mounted and travels on suitable sprocket-wheels therefor, arranged in sets 13, 14, 15, and 16, and in the upper portion of its course on ways 17 on the frame. The sprocket-wheels 13 and 16 are journaled on the frame, and the sprocket-wheels 14 and 15 are journaled on suitable supports below the floor A and are disposed at angles in the course of the carrier, the course of the carrier being such that it runs upwardly at the left as constructed and shown in the drawings, and thence runs on an incline upwardly and toward the right on the ways 17. Two of the sprocket-wheels 13 are geared to the driving-shaft 18, which is driven from any suitable source of power. A rail or rails 19, having their initial portions opposite to the carrier just below and adjacent thereto at the extremity of the travel of the carrier in a horizontal direction in its upper portion, are disposed parallel to the rungs 12. The several rails 19 lead respectively from the carrier to different sets of scalding-tubs. These rails or skids are inclined downwardly from their initial portion at the carrier, so that when the hogs are suspended thereon they will automatically slide along on the skids away from the carrier. A double hook 20, having beaks that turn over and project from the shank in opposite directions to each other, is provided with a short chain 21 and a small single terminal hook 22, and is used for suspending the hog on the carrier and on the skid 19.

In use the chain 21 is put around the leg of a hog, and the hook 22 is caught over the chain so as to form a slipping noose about the leg, which is thereby securely held in the chain. One beak of the hook 20 is then caught onto a rung 12, and the carrier being in motion the hog is elevated, as shown at the left in Fig. 1, and is thence transported along the way 17 to the right of the apparatus, and as the hog descends in the course of the carrier the free beak of the hook 20 engages the rail 19, and the rung of the carrier is withdrawn therefrom as the carrier passes on, leaving the hog suspended on the rail, which being suitably greased or lubricated permits and gravity causes the hog to slide down on the rail or skid away from the carrier.

Collars or bosses 23 fixed on the rungs 12 at suitable distances apart prevent the hooks 20 from sliding laterally thereon any considerable distance. Each rung is adapted to and may support one, two, or more hogs thereon at the same time.

It will be noted that the carrier 10 has the lower portion of its course below the floor A, and that it comes up through the floor at one side of the pen. A low wall or guard B' is erected across the pen alongside of the carrier, dividing the pen into two compartments, this guard being adapted to prevent hogs in the pen from crowding against and being injured by the moving carrier, and to prevent them getting their legs into the opening in the floor through which the carrier runs. The operator slips the chain 21 around the leg of the hog in the pen and nooses it thereon, and then hangs the hook 20 on a rung of the moving carrier. The subsequent action of the carrier has been described hereinbefore.

The pen surrounded by the walls B is of rather small size and extends along in front of the portion of the carrier that moves upwardly, (at the left, as seen in Fig. 1;) but as it is desirable to have a large number of hogs at hand so that the supply shall be constant for a considerable time, a larger pen or yard C, opening into the smaller pen, is partially inclosed by the curved wall E, and a gate or sweep F is hinged on the wall B or some suitable support at or adjacent to one side of the entrance from the yard C to the pen, this sweep being so constructed and arranged as to inclose a side of the yard C, and so that as it is swung toward the pen it will sweep over and across the yard C toward the entrance to the pen, the free end of the gate or sweep being close to and following the curved wall E, whereby hogs in the yard C are crowded into the pen. For automatically swinging the gate F inwardly toward the pen, it is provided with a draft-rope G, which being attached at its outer free end runs over a pulley H and onto a winding-drum I. This winding-drum I is journaled at one side loosely in the frame so as to be capable of a slight tilting movement, and the other extremity of the journal of the drum has its bearings and is supported in one extremity of the lever-arm K pivoted medially on the frame. A friction-pulley L on the journal of the drum I is adapted to be put into contact with a friction-pulley M on the driving-shaft 18. A block or shoe N, fixed on the frame just beneath the friction-pulley L, is adapted to receive and engage that pulley when released from the pulley M, holding or locking the drum I against revolution, and thus preventing the unwinding of the draft-rope G and the movement of the gate F outwardly. It will be understood that by tilting the lever K so as to put the friction-pulley L into contact with the pulley M when the shaft 18 is in motion the draft-rope G will be slowly wound up, thus moving the gate F inwardly across the yard C, and that by releasing the lever K, letting the pulley L drop away from pulley M into engagement with the block N, the draft-rope G will be held taut and the gate F will thereby be held against being pushed open, and that by lifting the pulley M out of engagement with the block N, but not sufficiently far to put it in engagement with the pulley M, the drum will be free to revolve and the draft-rope G to unwind, whereby the gate can be pushed backward and opened. The free arm of the lever K can be provided with a suspended and dangling rope to be readily caught hold of by the attendant, if desired, for lifting the pulley L. The gate F is provided with a wheel O, adapted to travel on the floor and support the weight of the outer extremity of the gate.

It will be observed that the rungs in the carrier connecting two of the chains 11 are arranged in series alternating with the rungs connecting the other chain 11 with the intermediate chain, thus practically forming two longitudinal divisions of the carrier. This arrangement of the rungs alternately in adjacent divisions is desirable to enable the attendants to hang hogs on one rung and then to hang other hogs on the succeeding alternating rung before the succeeding rung of the first division of the carrier shall have come into position for use, it being necessary to locate the rungs of each series sufficiently far apart to give ample clearance for convenient use. It should also be understood that the size and capability of the carrier can be increased to any extent desirable by adding other divisions at the side, each made up of an additional chain and connecting-rungs and the necessary supporting and driving mechanism; also that in the apparatus as shown in Fig. 2 one division of the carrier may be omitted, thus providing a carrier consisting of one division only having successive parallel rungs.

Having thus described my invention, what I claim, and desire to secure by Letters Patent, is—

1. The combination of an endless hog-carrier, a hog-pen adjacent to the carrier, a yard for hogs opening to the pen, a wall or fence at one side of the yard, a swinging gate or sweep hinged to swing alongside of and past the wall toward the pen, and means for automatically swinging the gate inwardly, substantially as described.

2. The combination, with a pen for hogs, of an endless carrier running up from the pen to a distant point, rungs in the carrier, hooks adapted to engage the rungs, and having means for engaging the hogs, collars or bosses fixed on the rungs to limit the lateral movement of the hooks, a rail or rails, or skids adjacent to and leading from the carrier, and means for driving the carrier, substantially as described.

3. The combination of a driving-shaft, an endless hog-carrier driven by the driving-shaft, a hog-pen adjacent to the carrier, a yard for hogs opening to the pen, a curved wall or fence at one side of the yard, a swinging gate or sweep hinged to swing alongside of and past the curved wall toward the pen and means in connection with said driving-shaft substantially as described for automatically swinging the gate inwardly.

4. The combination of a driving-shaft, an endless hog-carrier driven by the driving-shaft, a hog-pen adjacent to the carrier, a yard for hogs opening to the pen, a gate mounted to sweep over the yard, a winding-drum, a draft-rope attached to the gate and winding on the drum adapted to close the gate, a friction-pulley on the shaft of the drum, a friction-pulley on the driving-shaft, and a pivoted lever in which the drum-shaft is journaled at one end whereby by the tilting of the lever the pulley on the drum-shaft can be put into contact with the pulley on the driving-shaft, substantially as described.

5. In an apparatus for gathering and transporting hogs, the combination with a driving-shaft and an endless hog-carrier adjacent to and driven by the shaft, of a swinging gate mounted to sweep over an adjacent yard, a winding-drum, a draft-rope attached to the gate and winding on the drum, a friction-pulley on the driving-shaft, a friction-pulley opposite thereto on the shaft of the drum, a pivoted lever in which one end of the drum-shaft is journaled, and a brake block or shoe located below the friction-pulley on the drum-shaft and adapted to receive thereon and by friction to prevent the rotation of the drum, substantially as described.

In testimony whereof I affix my signature in presence of two witnesses.

SOLON DEDERICK.

Witnesses:
C. T. BENEDICT,
ANNA V. FAUST.